United States Patent [19]

Bennett

[11] Patent Number: 5,000,138

[45] Date of Patent: Mar. 19, 1991

[54] ENGINES FOR USE WITH GASOUS FUELS

[76] Inventor: John R. McR. Bennett, 526 Bourke Street, Melbourne, Victoria, Australia, 3000

[21] Appl. No.: 561,365

[22] Filed: Jul. 31, 1990

Related U.S. Application Data

[60] Continuation of Ser. No. 448,226, Dec. 11, 1989, abandoned, which is a division of Ser. No. 171,002, Jan. 19, 1988, Pat. No. 4,911,124.

[30] Foreign Application Priority Data

May 21, 1986 [AU] Australia ............... PH6014

[51] Int. Cl.⁵ ............................................. F02P 13/00
[52] U.S. Cl. ........................ 123/169 PA; 123/27 GE; 123/595
[58] Field of Search ......... 123/90.16, 169 PA, 169 R, 123/595, 647, DIG. 7, 169 P, 169 PH, 27 GE, 526

[56] References Cited

U.S. PATENT DOCUMENTS

| | | | |
|---|---|---|---|
| Re. 26,145 | 1/1967 | Friddell | 123/DIG. 7 |
| 2,802,460 | 8/1957 | Shirley | 123/27 GE |
| 2,997,991 | 8/1961 | Roan | 123/90.16 |
| 3,077,189 | 2/1963 | Earnshaw et al. | 123/169 P |
| 4,187,810 | 2/1980 | Buehner | 123/90.16 |

Primary Examiner—Andrew M. Dolinar
Attorney, Agent, or Firm—Dorsey & Whitney

[57] ABSTRACT

A method of installing spark plugs in a diesel internal combustion engine during conversion of the engine to a spark ignited internal combustion engine using gaseous fuel works with an engine originally having a cylinder block, a cylinder head cooperable with the cylinder block, a rocker box cooperable with the cylinder head and a diesel fuel injector for each cylinder of the cylinder block originally intended to inject diesel fuel into said cylinder. The method involves: removing each diesel fuel injector and replacing it with a spark plug adapter sleeve with a spark plug communicating with the cylinder from which the respective injector has been removed; fixing a plurality of extension sleeves to the rocker box, each extension sleeve being associated with one spark plug adapter sleeve; and providing a seal ring for sealing between the inner end of each extension sleeve and the outer end of the associated spark plug adapter sleeve when the rocker box is fixed on the cylinder head.

8 Claims, 8 Drawing Sheets

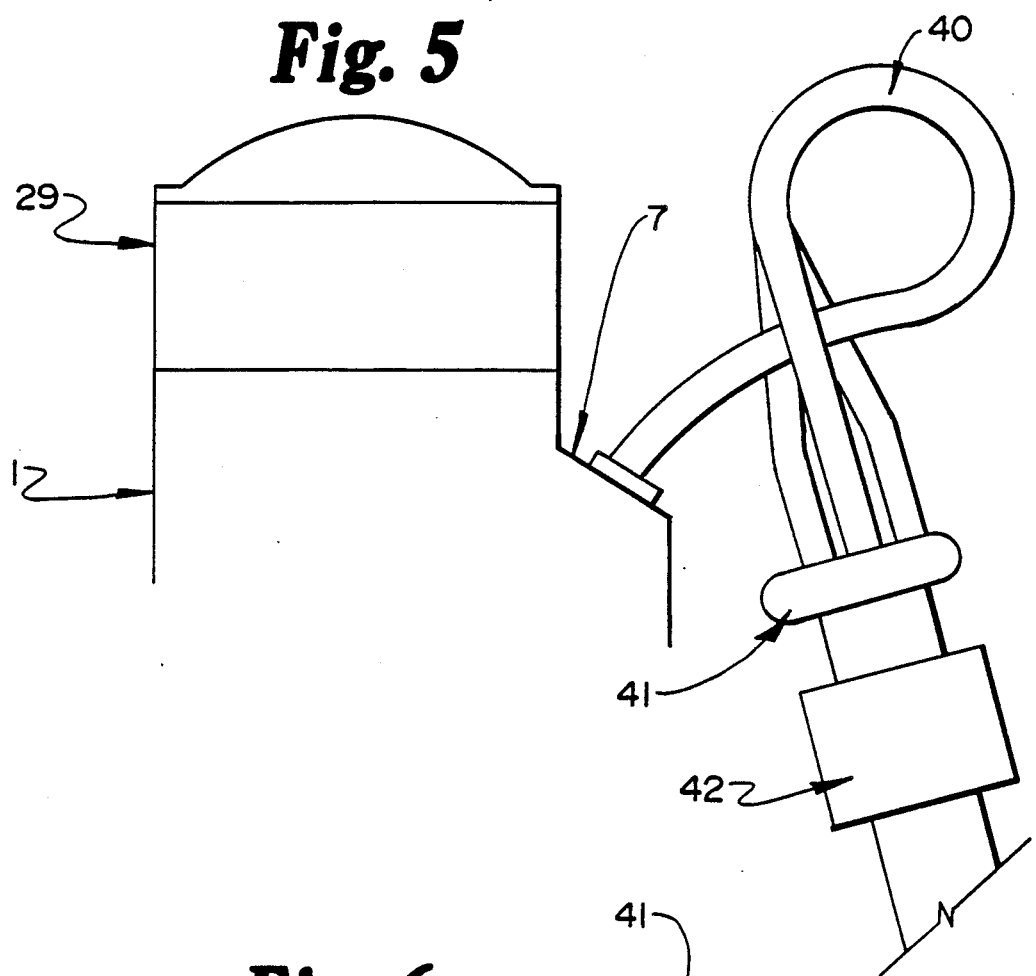
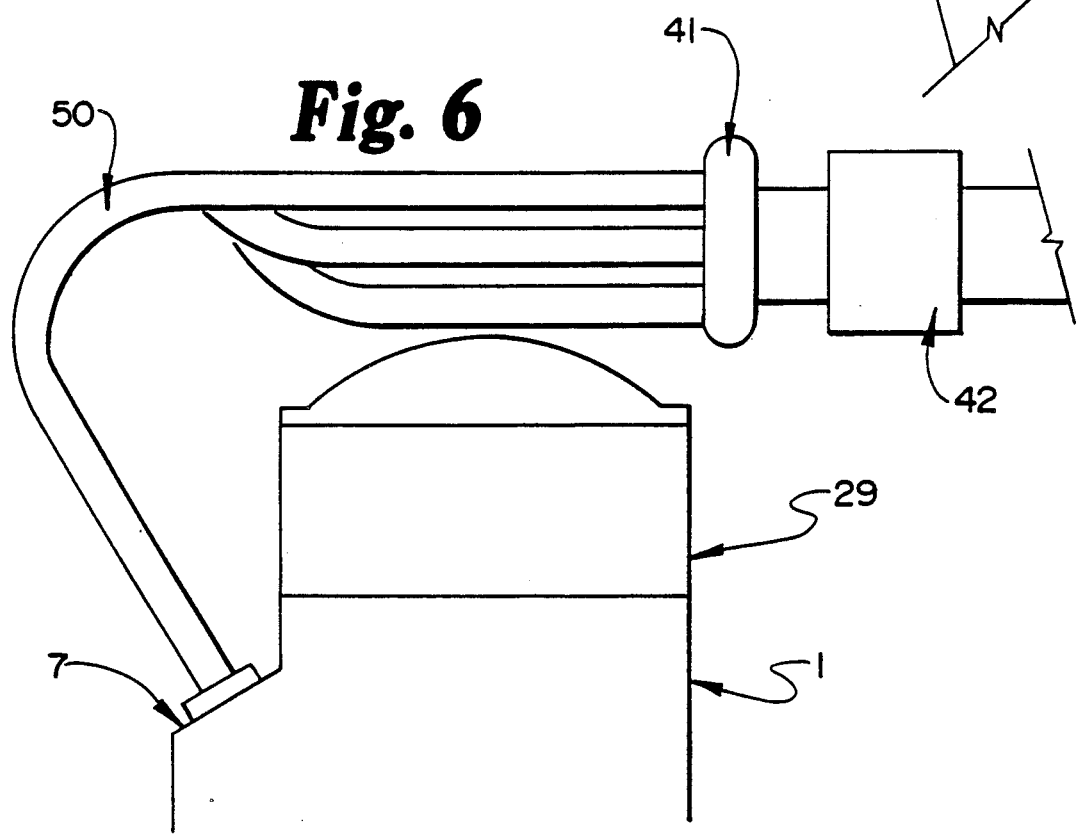

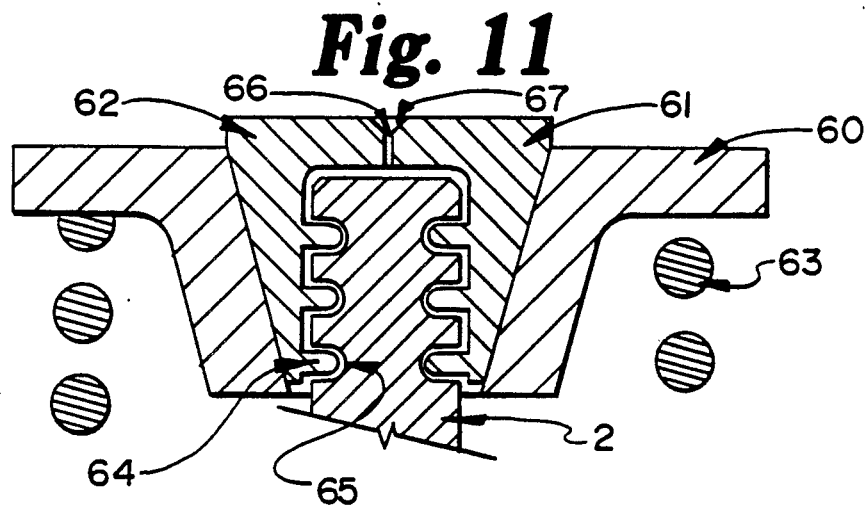
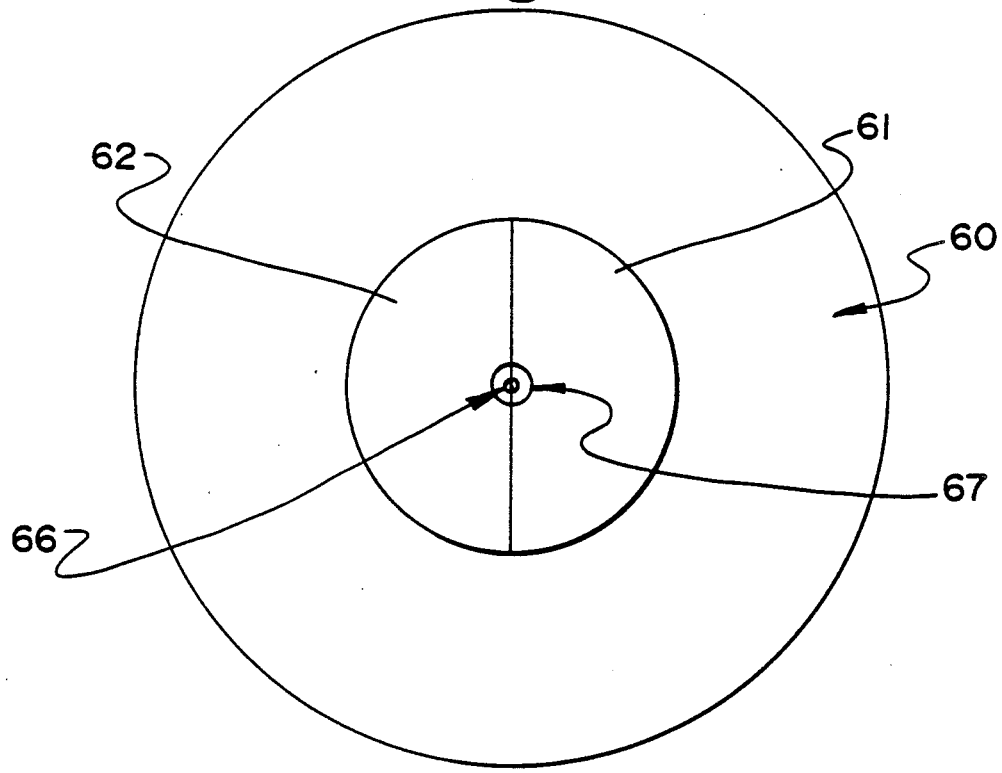

ENGINES FOR USE WITH GASOUS FUELS

This is a continuation of application Ser. No. 07/448,226 filed Dec. 11, 1989, now abandoned, which is a division of application Ser. No. 07/171,002 filed Jan. 19, 1988, U.S. Pat. No. 4,911,124.

The invention concerns means by which piston internal combustion engines, in particular those made for diesel fuel operation, may be converted to operate upon gaseous fuels.

Gaseous fuels have been used in the piston internal combustion engine in a minor way from the earliest days of its development. Until the Oil Shock of 1973, liquid fuels were, except in times of war, in ample supply at a relatively low price. Where gaseous fuels were employed, they were either a readily-available by-product of an industrial process such as sewer gas, or an alternative fuel available in a remote location such as producer gas used in mining operations.

Considerable experimentation has been undertaken into the use of gaseous fuels in the piston internal combustion engine and their use is well-known in the art. Generally speaking, however, the lower cost of gaseous fuels has not proved sufficiently attractive to enable them to supplant the more conveniently-handled and stored liquid fuels. As a result of the substantial increase in the price of petroleum products since 1973, this has now changed.

The price increase has stimulated considerable experimentation into the use of alternative fuels. Those most freely available for automotive use, and which have attracted considerable interest from the road transport industry, are natural gas and the group of fuels known generally as liquefied petroleum gas. The principal constituent of natural gas is methane and the most suitable for automotive use of the liquefied petroleum gas group is propane.

Both gasoline and diesel-powered engines are currently being converted to operate on gaseous fuels. However, it is widely accepted that, because of the lower calorific value of the gaseous fuel, the converted engine will suffer a decrement in power output. The principal cause of this power decrement is the fact that the gaseous fuel constitutes some ten percent by volume of the total charge inducted into the engine. In contrast, the atomised fuel droplets carried in the inducted airstream of a conventionally-carburetted gasoline-powered engine constitute, by volume, only a very small percentage of the total charge volume. The displacement of charge air by the gaseous fuel reduces the amount of oxygen available for combustion and thus, by reducing the amount of fuel which can be burned, reduces the power output of the engine. The provision of a so-called free-flow exhaust system may compensate for the power loss in a minor way by improving volumetric efficiency.

Diesel-powered engines are currently being converted to gaseous fuel operation in two ways. In the first method, the diesel operating principle is retained in an engine, gaseous fuel being fed into the induction system at an increasing rate as an increase in engine power is required. Diesel fuel flow is held to a minimum of approximately fifteen percent of normal, to ensure adequate injector cooling. Gaseous fuel flow is controlled simply by valves mechanically linked to the throttle, or by a more complex micro processor-controlled system. The basic shortcoming of this supplementary fuel system is the fact that the complicated, expensive and fuel quality-sensitive diesel fuel system must be retained and further complicated by the requirement for an additional fuel storage, supply and metering system. Although this arrangement fails to realise the energy potential of the fuel, fuel cost savings have been sufficient to make conversion attractive.

A more effective conversion of diesel-powered engines is achieved by the complete replacement of the diesel fuel system with a gaseous fuel system and the provision of a spark ignition system. In some cases, the camshaft is modified or replaced and the compression ratio of the engine is altered to suit the octane rating of the new fuel.

Although both of the diesel engine conversion methods outlined have been employed in automotive engines, they have been most successfully applied to engines employed in stationary, sustained-load type operations such as water pumping, well-head natural gas pumping and power generation. This is because of difficulties in creating converted engines with torque characteristics which will accommodate the rapid changes in R.P.M. and load demanded of engines in automotive applications. In most cases, converted engines also suffer from reduced power output as a result of the previously-described displacement of charge air by the gaseous fuel. In some cases, this effect is mitigated by the employment of turbo-charging. Engines adapted to gaseous fuel operation by an original equipment manufacturer are usually priced at a considerable premium over the unconverted engines.

Notwithstanding the power losses suffered by converted engines, the fuel cost savings achieved have been sufficiently attractive to create a market for converted engines or the means by which they may be converted.

The present invention aims to provide both features of an original engine design, and means for converting an existing engine to incorporate said features, whereby the engine will operate with improved flexibility and higher fuel efficiency on gaseous fuels. Preferred objectives include the reduction of engine noise and exhaust emissions and to provide arrangements where engine maintenance is both reduced and easier to achieve.

According to a first aspect of the present invention there is provided an arrangement in a reciprocating internal combustion engine having a cylinder block with a plurality of cylinders located therein, each having piston and connecting rod means reciprocable within a said cylinder to drive a crank shaft, said engine further including one or more cylinder heads with a plurality of combustion chamber zones each of which is adapted to register with one of said cylinders and with each of the said combustion chamber zones having one or more inlet valve means controlling flow of fuel/air charge into the combustion chamber zones and an exhaust valve means controlling flow of exhaust gases therefrom, and inlet and exhaust valve actuating means embodying an improvement comprising means for reducing opening of the exhaust valve means during part throttle operation of the engine.

In accordance with the objective of providing means for converting an existing engine to gaseous fuel operation, the present invention also proposes the provision of a cylinder head arrangement for a reciprocating internal combustion engine including a plurality of combustion chamber zones adapted to register with respective cylinders of the internal combustion engine, each of said combustion chamber zones having associated therewith one or more inlet valve means and exhaust valve means adapted to control flow of a fuel/air charge into the combustion chamber zones and to control flow of exhaust gases therefrom, and inlet and exhaust valve actuating means embodying an improvement comprising means for reducing opening of the exhaust valve means during part throttle operation of the engine.

Conveniently the inlet and exhaust valve means are operated by rocker members rotatably supported on rocker shafts located above said combustion chambers. Preferably the rocker members are actuated by push rod members moved by a suitably located cam shaft. The rocker member operating the exhaust valve means may comprise a primary rocker member and a secondary rocker member, one end of the secondary rocker member being operably associated with the exhaust valve means and the other end being arranged to pivot relative to an adjustable fulcrum. One end of the primary rocker member is moved by a suitable push-rod member operated by a cam on the cam shaft, whilst its other end is adapted to bear upon the secondary rocker member, causing it to pivot about said adjustable fulcrum. Adjustment of the fulcrum position varies the amount of exhaust valve lift to minimise reflux of exhaust gases into the combustion chamber during operation of the engine under different load conditions.

According to another preferred aspect, means may be provided to momentarily open the exhaust valve means for each combustion chamber when the respective piston approaches top dead centre on the compression stroke during overrun operation, to achieve a compression braking effect. This might be conveniently achieved by momentarily adjusting the position of the secondary rocker member in the previously described arrangement by adjusting the height of its fulcrum.

According to the present invention the improved cylinder head arrangements may be either built into an engine design or provided as a replacement cylinder head for conversion of an existing engine to operation with gaseous fuels. In this respect the present invention also provides a novel push rod assembly means enabling a push rod means to be comprises of a number of parts where a direct in line push rod extending from the cam shaft straight to the appropriate rocker member is not possible. In accordance with this aspect the present invention comprises a push rod assembly having at least two parts separated by a sliding connector, each said push rod part having one end in pivotal engagement with said sliding connector on opposed sides thereof and the sliding connector having an outer surface adapted to slide within a bore in the engine cylinder head upon said push rod means being moved by the associated cam shaft.

According to a further aspect of the present invention there is provided an improved arrangement in a reciprocating internal combustion engine having a cylinder block with a plurality of cylinders located therein, each having a piston and connecting rod means reciprocable within a said cylinder to drive a crank shaft, said engine further including a cylinder head with a plurality of combustion chambers each of which is adapted to register with one of said cylinders, the improvement comprising intake passage means extending at acute angles to the cylinder axis through the cylinder head to said combustion chambers and exhaust passage means leading from each combustion chamber and exiting through a side wall of the cylinder head, and valve means controlling flow through said intake and exhaust passage means. Conveniently two intake passages and one exhaust passage is provided for each combustion chamber.

According to a particularly preferred aspect of the present invention there is proposed a novel form of exhaust manifold which provides both an effective and inexpensive replacement manifold in a conversion operation. According to this aspect an exhaust stub member is fixed to the cylinder head coaxial with each of the exhaust passages with intermediate exhaust pipes inserted into each stub member and leading to a common collector member which directs the exhaust gases to a common discharge pipe. The individual intermediate exhaust pipes may simply be press fitted into the exhaust stub members or may be clamped thereto.

According to a preferred arrangement of the present invention described in more detail hereinafter, a cylinder head is provided which embodies one exhaust valve controlling the flow of exhaust gases through one exhaust port and two inlet valves controlling the flow of fuel-air mixture through two inlet ports.

Said exhaust port is made short, turning through approximately sixty degrees before exiting the side of the said cylinder head casting through a threaded bore. Except where a fairing enclosing the end of the valve guide intrudes into it, the said exhaust port is preferably made more or less square in cross sectional shape.

Said inlet ports are made with a more or less square cross sectional shape and descend steeply through the said cylinder head from an inlet manifold attachment face positioned on one side of the cylinder head casting and made normal to the axes of the upper parts of the said inlet ports.

The heads of the said valves are located in part-spherical recesses in the said cylinder head casting lower deck, the more or less triangular flat surfaces between the said recesses forming squish surfaces. Carried in the lower part of the bores through which the pushrods pass are sliders retained by circlips inserted into grooves beneath them. The usual single pushrod for each rocker is replaced by two pushrods, one extending from the cam follower to the said slider and one extending from the slider to the rocker.

The said two inlet valves for each cylinder are operated by a single bifurcated inlet valve rocker carried on a separate inlet valve rocker shaft, said rocker being provided with conventional lash adjustment means. Said exhaust valve is operated by the combined action of two rockers, hereinafter referred to as primary and secondary exhaust valve rockers. The pushrod for the said exhaust valve operates the said primary exhaust valve rocker which is carried on a separate exhaust valve rocker shaft.

Fixed to the free end of the said primary exhaust valve rocker is a roller which coacts with a recess in the upper surface of the said secondary exhaust valve rocker. One end of the said secondary rocker is provided with a roller which bears upon the head of the stem of the said exhaust valve, the other being supported by a fulcrum, the position of which is slideably adjustable by means of a fulcrum adjustment rod extending out through the side wall of the said cylinder head casting.

The position of the said fulcrum, and thus the lift of the said exhaust valve is adjusted by extending inwards or retracting the said rod by means of a suitable operating mechanism.

The head of the said siding fulcrum is provided with rollers which permit it to move freely. Lash of the said exhaust valve is adjusted by repositioning the outer stop of the said fulcrum adjustment rod. The said adjustable fulcrum is supported upon a sliding wedge member which is supported upon an inclined plane by rollers.

The position of said wedge member is slideably adjustable by means of a wedge member adjustment rod extending out through the side wall of the said cylinder head casting.

Provision is made to momentarily crack the said exhaust valve off its seat as the piston approaches top dead centre on the compression stroke to generate a compression braking effect during overrun operation. Said cracking of the said exhaust valve is achieved by momentarily extending inward the said wedge member adjustment rod at an appropriate timing. Said momentary inward extension of the said wedge member adjustment rod is achieved by means of a small ram operated by a flow of compressed air controlled by a solenoid valve, or by electro-hydraulic means.

In an alternative embodiment, said wedge member and its adjustment rod are deleted and the outer, free end of the said secondary exhaust valve rocker is momentarily raised at an appropriate timing by means of a rotating cam. Said cam is fixed to an auxiliary camshaft driven from the engine crankshaft at half crankshaft speed, or driven by a suitable electrically-operated stepper motor.

The area above each cylinder head is enclosed by a rocker box in the end walls of which are supported one end of each of the said rocker shafts. The outer end of the said inlet valve rocker shaft is supported wholly in a bore in the end wall of the said rocker box. The outer end of the said exhaust valve rocker shaft, the axis of which is coincident with the rocker box to cylinder head parting face, is supported in a bore half in said rocker box and half in said cylinder head.

Said rocker box is made with a medial web normal to the axes of the said rocker shafts, to the underside of which is bolted a rocker shaft mounting block in a bore in which is supported the inner end of the said exhaust valve rocker shaft. The said inlet valve rocker shaft is made such that its axis is coincident with the said medial web to said mounting block parting face and is captured in a bore positioned half in each. The bore in the said mounting block accommodating the end of the said exhaust valve rocker shaft is opened with a saw cut in such a way that the pressure of one of the said bolts fixing the said mounting block to the said medial web acts to clamp the end of the said exhaust valve rocker shaft in its said bore.

Another of the said bolts by which the said mounting block is fixed passes through the end of the said inlet valve rocker shaft and the bore in which it is accommodated. The top of the said rocker box is closed by a suitable cover, said cover being provided with suitable removable plugs giving access to the rocker lash adjustment means. Screwed into the said threaded bores in the side of the said cylinder head casting are exhaust stubs into which individual cylinder exhaust pipes are inserted.

The outer ends of a plurality of the said exhaust pipes are inserted into a plurality of stubs in one or more collector members which are adapted to direct the exhaust gases into main exhaust pipes or a turbo-charger casing. Said collector members are fixed to the engine structure, effectively capturing the said individual cylinder exhaust pipes.

In an alternative embodiment, complementary exhaust pipes and stubs are provided with coacting locking lugs by which said exhaust pipes are secured. Inlet manifolds comprise a plurality of long tubular runners of circular cross sectional shape, the ends of which terminate in flanges fixed to the inlet manifold mounting face on the side of the said cylinder head casting.

In the preferred embodiment, one of the said inlet manifold runners for each cylinder terminated in a separate plenum supplied with fuel-air mixture by a suitable gas fuel carburettor (mixer). Each of the said plenums is provided with a throttle valve and provision is made to operate the engine at idle and low to medium power on the fuel-air flow from one plenum only. At medium to high power, both throttle valves are opened.

In an alternative embodiment, all of the said inlet manifold runners are supplied with fuel-air mixture from one plenum supplied by one gas mixer, said flow being controlled by a single throttle valve. A conversion device is also provided which is inserted in place of the diesel fuel injector and forms a convenient spark plug housing.

A means of providing an enlarged tappet contact surface at the end of the exhaust valve is also provided.

The nature of the present invention will be more readily understood by the following description given in relation to the accompanying drawings illustrating the just described preferred arrangement. In the drawings:

FIGS. 5 and 6 show two alternative arrangements of the inlet manifold runners;

FIG. 11 in section and FIG. 12 in plan show a valve spring retaining collar which provides a larger bearing surface for the tappet roller.

Figure 1:
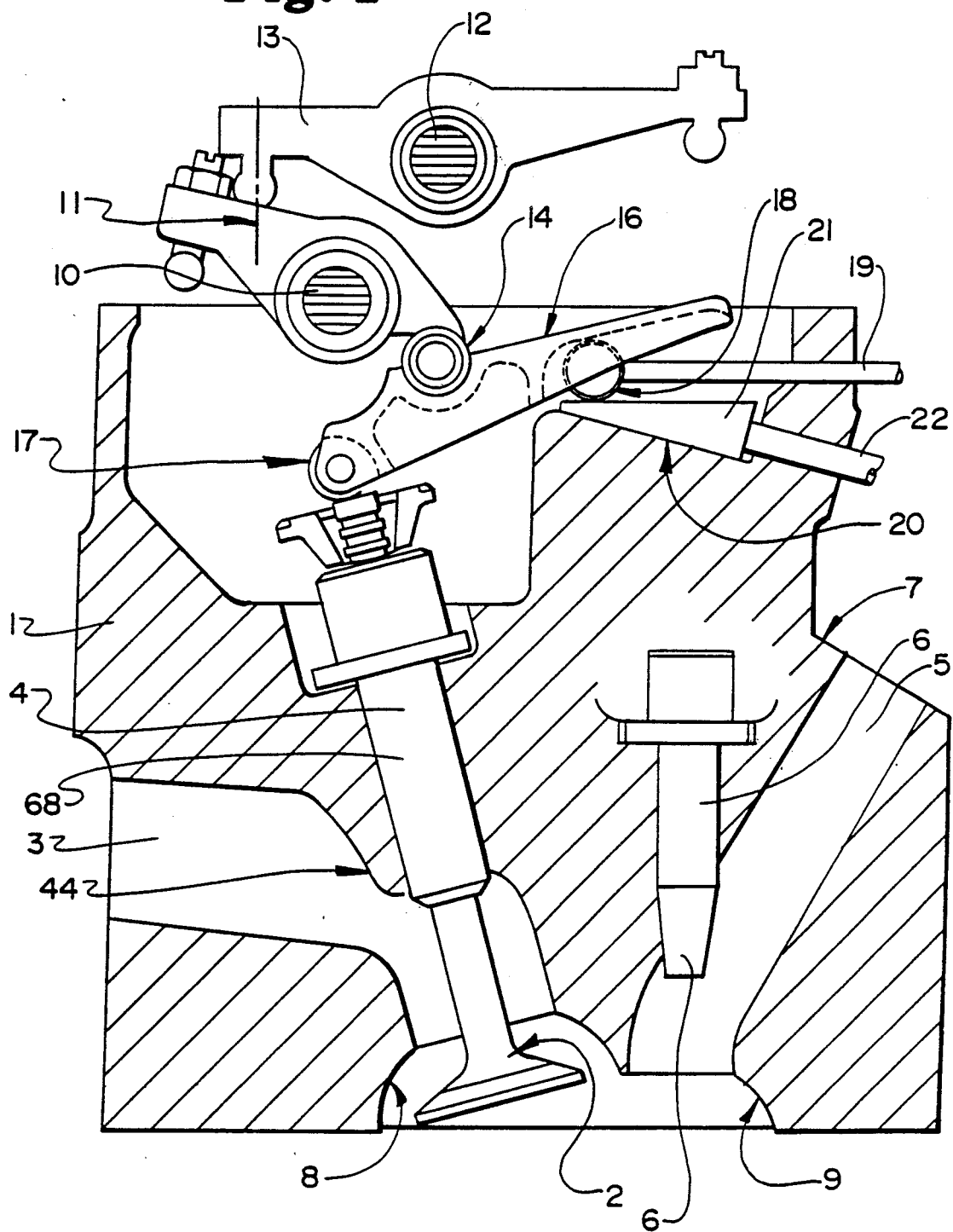
FIG. 1 is a transverse cross-sectional view of the cylinder head showing the arrangement of the exhaust valve actuating rockers.

With reference to FIG. 1, a replacement cylinder head is provided which embodies one exhaust valve 2 controlling the flow of exhaust gases through one exhaust port 3, and two inlet valves (not shown) controlling the flow of fuel-air mixture through two inlet ports 5. Said exhaust port is made short, turning through approximately sixty degrees before exiting the side of the said cylinder head casting through a threaded bore (depicted as 43 in FIG. 7).

Except where fairing 44 enclosing the end of valve guide 68 intrudes into it, the said exhaust port is made more or less square in cross-sectional shape. Said inlet ports are also made more or less square in cross-sectional shape and descend steeply through the said cylinder head from inlet manifold attachment face 7 positioned on one side of the said cylinder head casting and made normal to the axes of the upper parts of the said inlet ports.

The heads of the said valves are located in part-spherical recesses 8 and 9 in the lower face of the said cylinder head, the flat, more or less triangular areas of cylinder head face between them forming squish surfaces.

Figure 2:
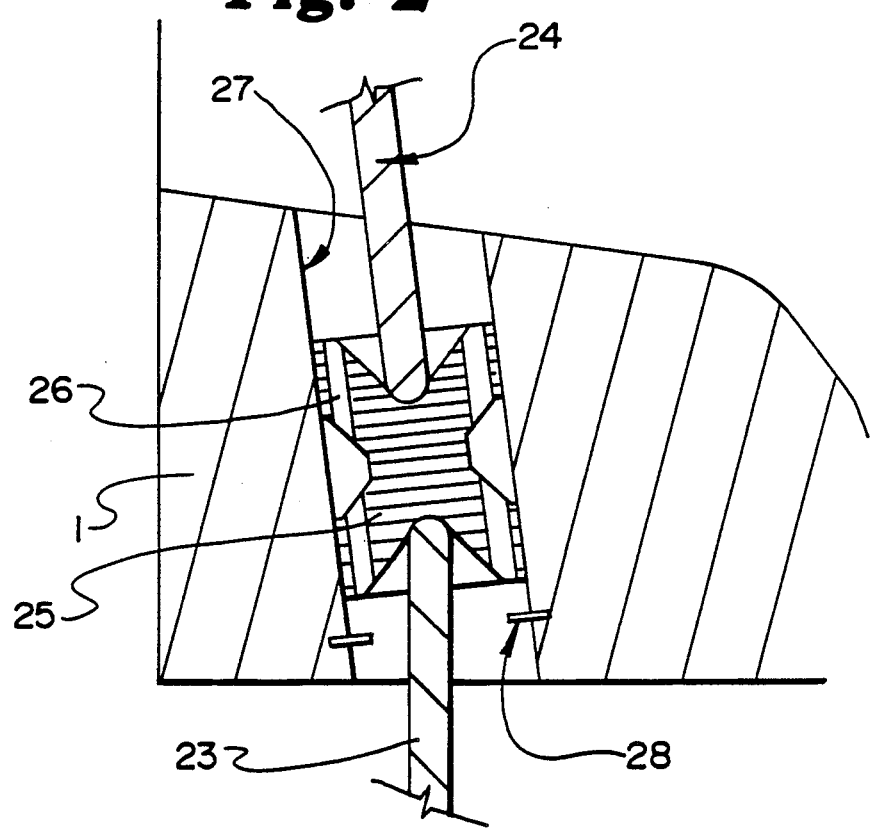
FIG. 2 is a cross-sectional view of the arrangement of the pushrod slider in the cylinder head.

With further reference to FIG. 2, carried in the lower part of bore 27 in the said cylinder head through which pushrod 24 passes in slider 25 retained by circlip 28 inserted into a groove beneath it. The usual single pushrod for each rocker is replaced by upper pushrod 24 extending from the said slider to the exhaust valve rocker and lower pushrod 23 extending from the cam follower to the said slider, said arrangement permitting adaption of original pushrod location to relocated components in the said replacement cylinder head. Bores 26 are provided in the said slider to permit draining of oil from the rocker box via the said pushrod bore.

Figure 4:
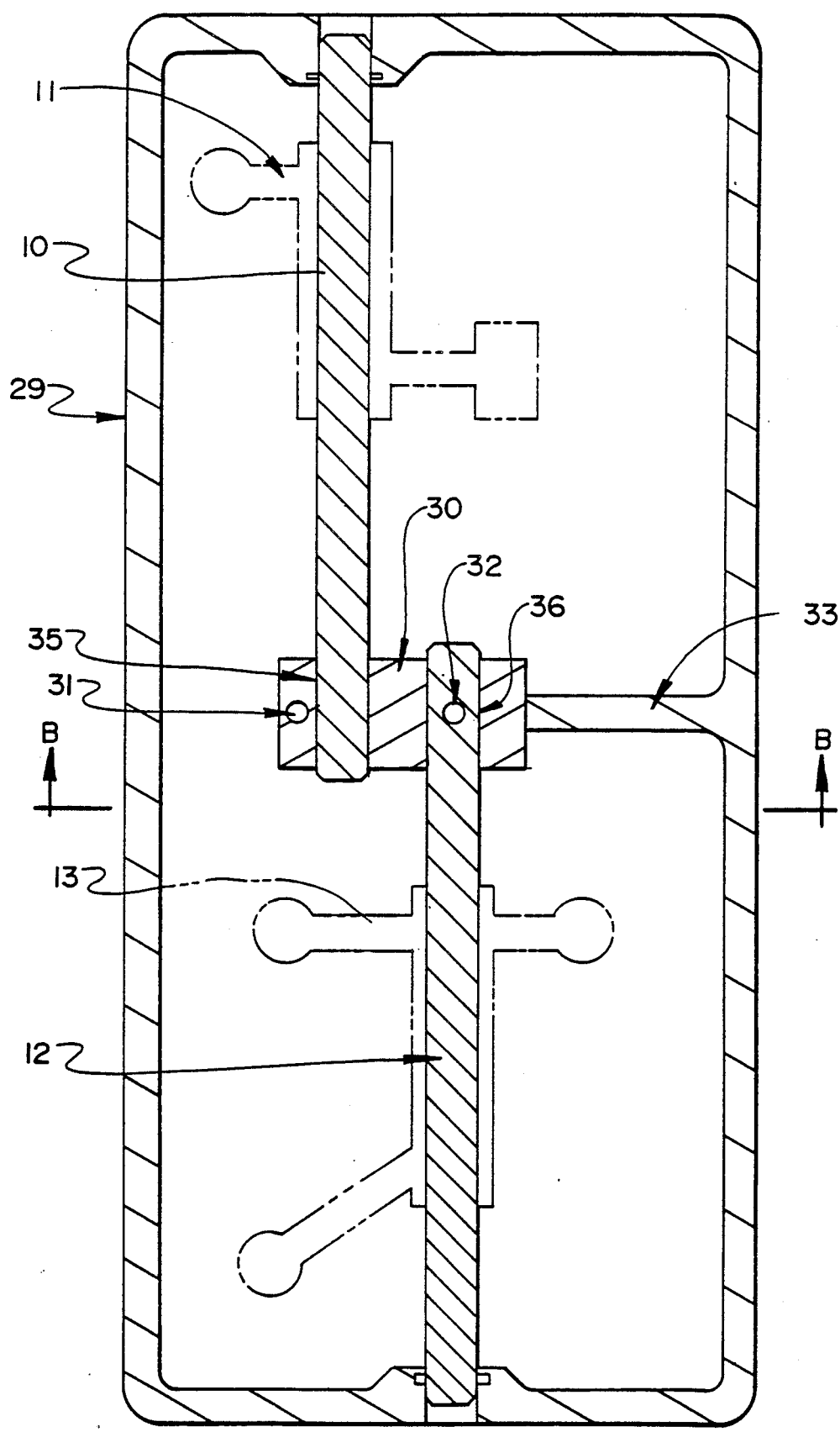
FIG. 4 is a longitudinal sectional view of the rocker box along the axis AA in FIG. 3 showing the arrangement of the rocker shafts and rockers within the rocker box.

With reference to FIG. 4 the said two inlet valves for each cylinder are operated by single bifurcated inlet valve rocker 13 carried on separate inlet valve rocker shaft 12, said rocker being provided with conventional lash adjustment means.

With reference to FIGS. 1 and 4 the said exhaust valve is operated by the combined action of two rockers, hereinafter referred to as primary exhaust valve rocker 11 and secondary exhaust valve rocker 16. Exhaust valve pushrod 24 operates the said primary exhaust valve rocker which is carried upon separate exhaust valve rocker shaft 10. Fixed to the free end of the said primary exhaust valve rocker is roller 14 which coacts with recess 15 in the upper surface of the said secondary exhaust valve rocker.

One end of the said secondary exhaust valve rocker is provided with roller 17 which bears upon the end of the stem of exhaust valve 2, the other being supported by fulcrum 18, the position of which is slideably adjustable by means of fulcrum adjustment rod 19, extending out through the side wall of the said cylinder head casting.

Said fulcrum adjustment rod 19 is provided with a means of articulation (not shown) inside the side wall of the said cylinder head casting. The position of the said fulcrum and thus the resultant lift of the said exhaust valve is adjusted by extending inward or retracting outward the said fulcrum adjustment rod by means of a suitable operating mechanism.

The head of the said sliding fulcrum is provided with roller which permit it to move freely, said rollers bearing separately against the underside of the said secondary exhaust valve rocker and the upper surface of wedge member 21 beneath it. The said primary exhaust valve rocker is provided with conventional lash adjustment means. The said adjustable fulcrum is supported upon wedge member 21 which is supported upon inclined plane 20 by suitable rollers (not shown) permitting it to move freely.

In an alternative embodiment, said rollers are replaced by two rows of balls (not shown) carried in complementary grooves in the mating faces of the said wedge member and the said inclined plane. The position of the said wedge member is slideably adjustable by means of wedge member adjustment rod 22 extending out through the side wall of the said cylinder head casting.

Provision is made to momentarily crack the said exhaust valve off its seat as the piston approaches top dead centre on the compression stroke, to generate a compression braking effect during overrun operation. Said cracking of the said exhaust valve is achieved by momentarily extending inward the said wedge member adjustment rod at an appropriate timing. Said momentary inward extension of the said wedge member adjustment rod serves to lift the said adjustable fulcrum and thus the outer end of the said secondary exhaust valve rocker, thereby depressing the said exhaust valve.

Actuation of the said wedge member adjustment rod is achieved by means of a small ram (not shown) operated by a flow of compressed air and controlled by a solenoid valve, or by electro-hydraulic means.

In an alternative embodiment, said wedge member and its adjustment rod are deleted and the said compression braking effect is achieved by raising the outer, free end of the said secondary exhaust valve rocker momentarily at an appropriate timing by means of a rotating cam bearing upon its underside.

Figure 3:
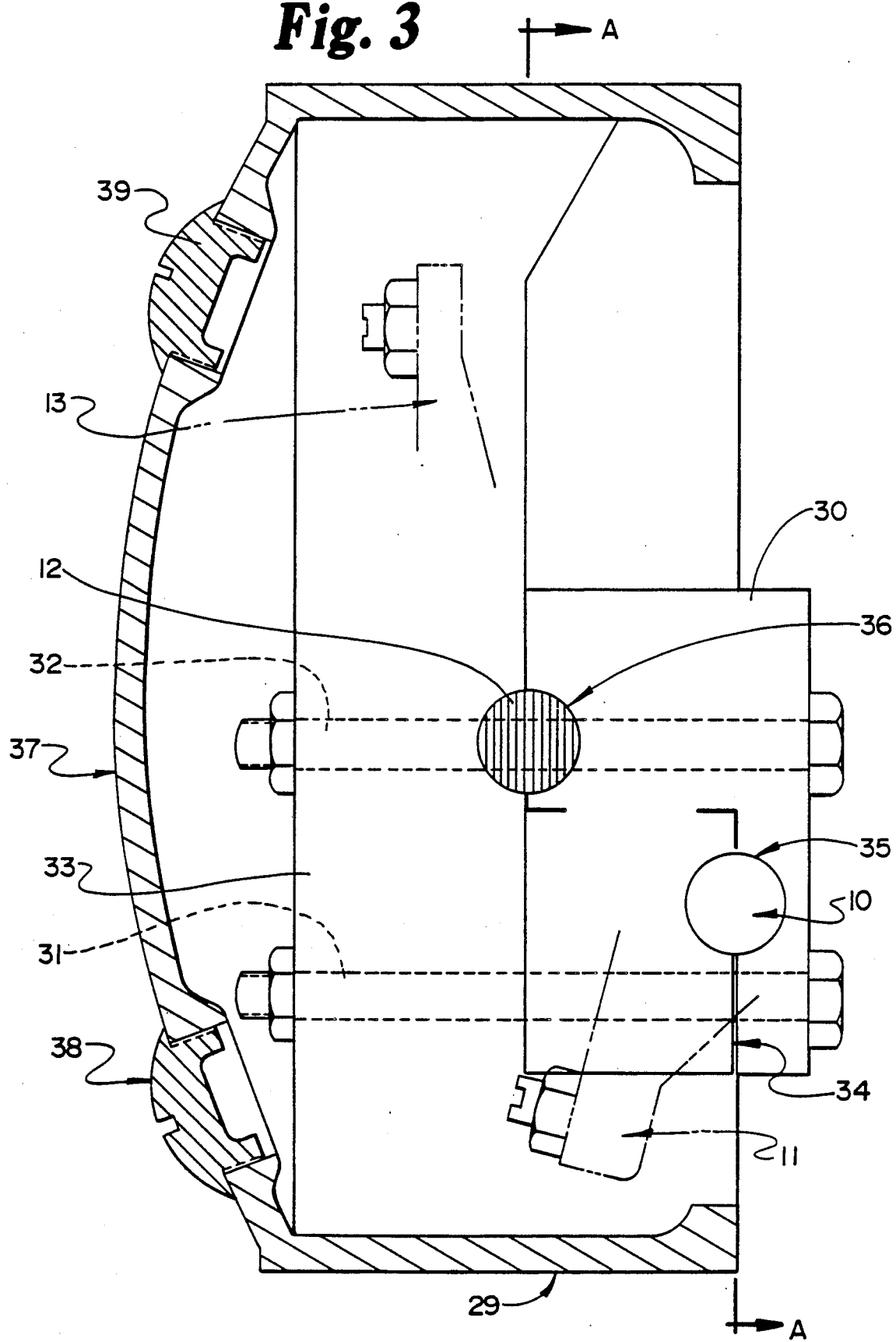
FIG. 3 is a transverse sectional view of the rocker box and id along the axis BB in FIG. 4.

Said cam is fixed to an auxiliary camshaft driven from the engine crankshaft at half crankshaft speed, or driven by a suitable electrically-operated stepper motor. With further reference to FIGS. 3 and 4, the area above each cylinder head is enclosed by rocker box 29, in bores in the end walls of which are supported one end of each of the two said rocker shafts. The outer end of the said inlet valve rocker shaft is supported wholly in a bore in the end wall of the said rocker box.

The outer end of the said exhaust valve rocker shaft, the axis of which is coincident with the cylinder head to rocker box parting face, is supported in a bore half in the said rocker box and half in the said cylinder head. Said rocker box is made with a medial web 33 normal to the axes of the said rocker shafts, to the lower edge of which is bolted rocker shaft mounting block 30, in a bore in which is supported the inner end of the said exhaust valve rocker shaft. The said inlet valve rocker shaft is made such that its axis is coincident with the said medial web to said mounting block parting face and is captured in a bore positioned half in each. The bore in the mounting block accommodating the inner end of the said exhaust valve rocker shaft is opened with saw cut 34, bolt 31 fixing the said rocker shaft mounting block to the said rocker box medial web serving to clamp the end of the said shaft in the said bore.

Another bolt 32 by which the said rocker shaft mounting block is fixed passes through the end of the said inlet valve rocker shaft and the said bore in which it is accommodated. The top of the said rocker box is closed by a suitable cover 37 which, in the preferred embodiment, is made removable, said cover being provided with suitable removable plugs 38 and 39 giving access to the said rocker lash adjustment means.

Figure 7:
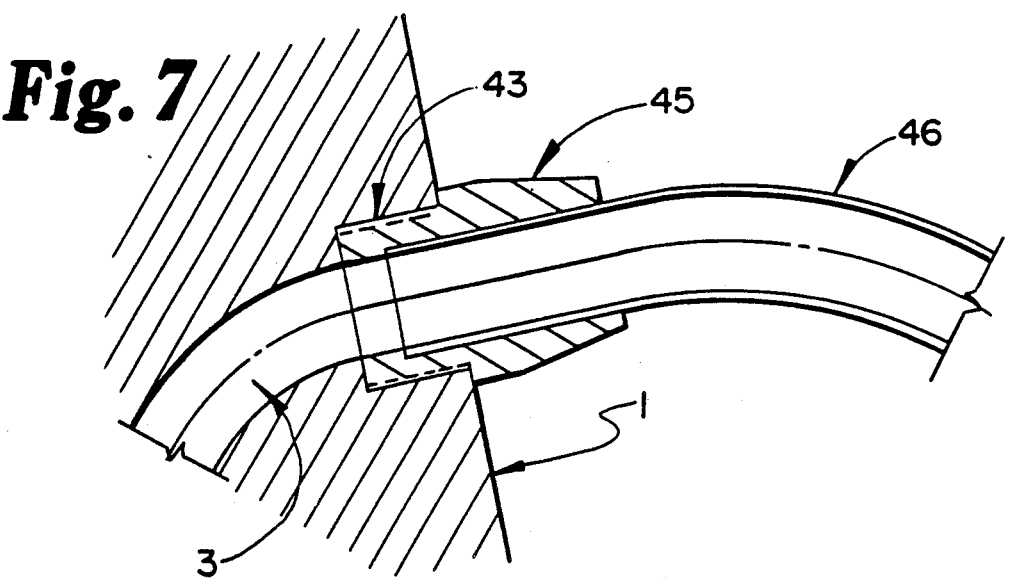
FIGS. 7, 8 and 9 show details of the arrangement of the exhaust system.
Figure 8:
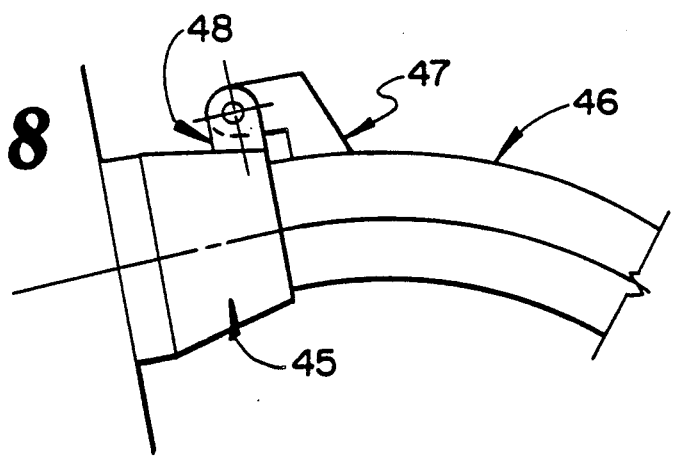
Figure 9:
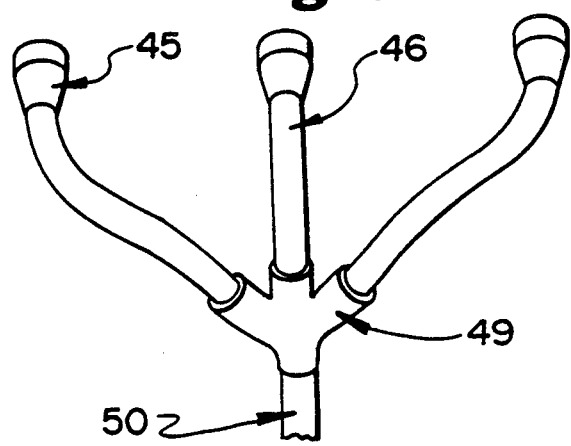

With further reference to FIGS. 7, 8 and 9, screwed into the said threaded bores in the side of the said cylinder head casting are exhaust stubs 45 into which individual cylinder exhaust pipes 46 are inserted. The outer ends of a plurality of the said individual cylinder exhaust pipes are inserted into a plurality of stubs in one or more collector members 49 which are adapted to direct the exhaust gases to exhaust pipe 50 or to the inlet casing of a turbo-charger. Said collector members are fixed to the engine structure, effectively capturing the said individual cylinder exhaust pipes.

In an alternative embodiment in which the said collector members are not positively located, complementary pairs of the said exhaust pipes and stubs are provided with coacting locking lugs 47 and 48 by means of which the said exhaust pipes may be secured.

With further reference to FIGS. 5 and 6, inlet manifolds comprise a plurality of long tubular runners 40 of circular cross-sectional shape, the ends of which terminate in flanges fixed to inlet manifold mounting face 7 on the side of the said cylinder head casting. In the preferred embodiment, one of the said inlet manifold runners for each cylinder terminates in a separate plenum 41 supplied with fuel-air mixture by a suitable gas fuel mixer 42.

Each of the said plenums is provided with a throttle valve and provision is made to operate the engine at idle and low to medium power on the fuel-air flow from one plenum only. At medium to high power, both throttle valves are opened. In an alternative embodiment, all of the said inlet manifold runners are supplied with fuel-air mixture from one plenum, said flow being controlled by a single throttle valve.

In conjunction with the said cylinder head design, said inlet manifold arrangement provides excellent torque production from a low R.P.M., high power and good fuel efficiency.

Figure 10:
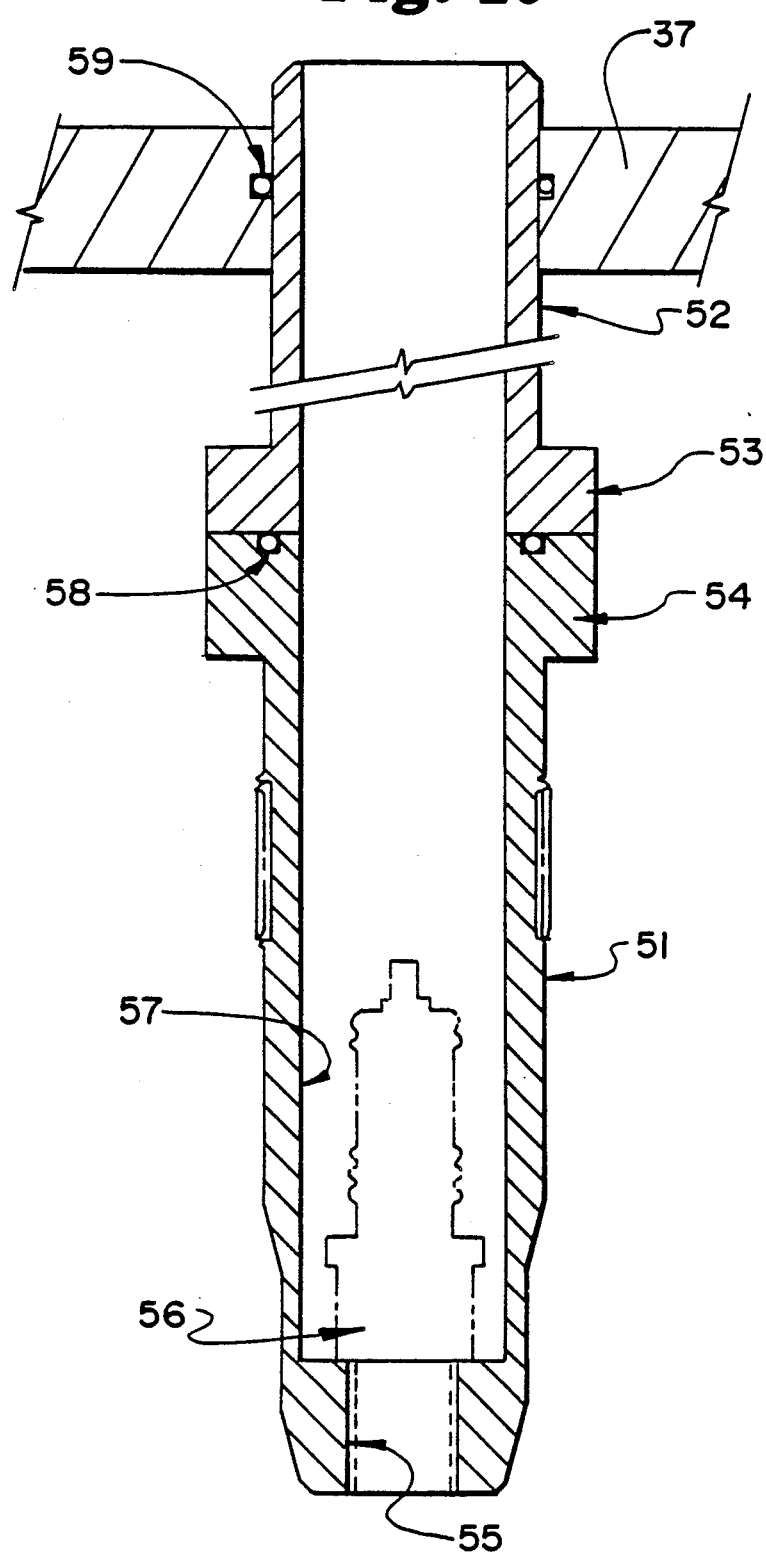
FIG. 10 shows a means of mounting a spark plug in a cylinder in a housing replacing the diesel injector.

With reference to FIG. 10, it is possible to operate some engines upon methane fuel without reducing the original diesel fuel compression ratios. Where this is possible and the performance decrement of a simple conversion is acceptable, it is possible to effect conversion from diesel fuel operation without the need to remove cylinder heads for modification to permit the installation of spark plugs.

Accordingly, spark plug adapter sleeve 51 is installed in place of the original diesel fuel injector, said sleeve being screwed or clamped into place in the normal way. The nose of the said adapter sleeve is provided with threaded bore 55, into which is screwed spark plug 56 accommodated within bore 57. The upper end of the said adapter sleeve is provided with flange 54 which abuts complementary flange 53 on extension sleeve 52, the faces of the said flanges being sealed by "O" ring 58. The upper end of the said extension sleeve is pressed or screwed into cover 37 of the said rocker box and sealed by sealing means 59.

The lengths of the two said sleeves are made such that, when the said rocker box is fixed into place, the complementary faces of flanges 53 and 54 will be firmly in contact.

With reference to FIGS. 11 and 12, some arrangements of the said primary and secondary exhaust valve rockers are such that the radial travel of roller 17 (as depicted in FIG. 1) on secondary exhaust valve rocker during valve actuation exceeds the width of the head of the stem of the said exhaust valve.

Accordingly, valve spring cap 60 is provided which is wedgably attached to the head of valve stem 2 by two wedging collets 61 and 62. Said wedging collets are made to extend above the said valve spring cap and fully enclose the head of the stem of the said exhaust valve to form a flat wear-resistant face of greater width.

The end of the stem of the said exhaust valve is provided with circumferential grooves 65 of generally semi-circular cross-sectional shape which coact with projections 64 made on the inside faces of the said wedging collets.

Clearance is provided between the said grooves and projections such that, with the said wedging collets locked into the said valve spring cap, the said valve is permitted axial float of approximately 0.2 mm.

Passing between the upper flat mating faces of the said wedging collets is oil hole 66 which is made with a chamfered opening 67. The action of tappet roller 17 passing over the said oil hole chamfered opening causes oil to be forced into the said opening. The said oil passes down through the said clearance between the said valve stem grooves and wedging collet projections, damping the axial float of the said valve.

Where an engine is to operate on a gaseous fuel with an octane rating less than that of methane, its compression ratio must be reduced. In the preferred embodiment, this is achieved by the provision of a piston with a crown shaped as a broad shallow dish surrounded by a flat annular squish surface the width of which is approximately ten to fifteen percent of the piston crown diameter.

Preferably, the depth of the said dish in the piston crown is made such that its cubic capacity is not less than twenty five percent of that of the total combustion chamber. The said reduction in engine compression ratio is achieved, where possible, by the removal of metal from the piston crown, or by the provision of replacement pistons.

To obtain the best torque and power from a converted engine, the diesel camshaft must be modified or replaced. Preferably, the valve phasing produced by the modified or replacement camshaft will be: inlet valve opening between twenty and thirty degrees of crankshaft rotation before top dead centre and closing between sixty and seventy degrees after bottom dead centre; and exhaust valve opening between sixty and seventy degrees of crankshaft rotation before bottom dead centre and closing between twenty and thirty degrees after top dead centre.

The exact valve phasing and cam profile providing the best result for a particular converted engine type will only be determined by experimentation.

I claim:

1. A method of installing spark plugs in a diesel internal combustion engine during conversion of the diesel internal combustion engine to a spark ignited internal combustion engine using gaseous fuel, said diesel internal combustion engine including a cylinder block, a cylinder head cooperable with said cylinder block, a rocker box cooperable with said cylinder head and a diesel fuel injector for each cylinder of the cylinder block originally intended to inject diesel fuel into said cylinder, said method comprising;
   (i) removing each said diesel fuel injector and replacing said injector with a spark plug adapter sleeve with a spark plug operably secured therein such that the spark plug communicates with the cylinder from which the respective injector has been removed;
   (ii) fixing a plurality of extension sleeves to said rocker box, each said extension sleeve being associated with one spark plug adapter sleeve and having an inner end cooperable with an outer end of the associated spark plug adapter sleeve; and
   (iii) providing seal means for sealing between the inner end of each extension sleeve and the outer end of the associated spark plug adapter sleeve when said rocker box is fixed on said cylinder head.

2. The method as recited in claim 1 further comprising providing seal means for sealing between each extension sleeve and the rocker box.

3. The method as recited in claim 1 wherein the step of providing seal means for sealing between each extension sleeve and the associated spark plug adapter sleeve comprises providing a flange at the outer end of the spark plug adapter sleeve and an "O" ring in the surface of the flange.

4. The method as recited in claim 1 further comprising providing a threaded bore at an inner end of each spark plug adapter sleeve opposite its outer end to receive and secure the spark plug.

5. A spark ignited internal combustion engine converted from a diesel internal combustion engine having a cylinder block, a cylinder head cooperable with said cylinder block, a rocker box cooperable with said cylinder head, and a diesel fuel injector fixing space for each cylinder of the cylinder block, said spark ignited internal combustion engine comprising:
 (i) a spark plug adapter sleeve located in each said diesel fuel injector fixing space with a spark plug operably secured in each said spark plug adapter sleeve such that each spark plug communicates with a respective one of said cylinders;
 (ii) a plurality of extension sleeves secured to said rocker box such that an inner end of each said extension sleeve is cooperable with an outer end of a respective one of said spark plug adapter sleeves; and
 (iii) seal means for sealing between the inner end of each extension sleeve and the outer end of the respective spark plug adapter sleeve.

6. The engine as recited in claim 5 further comprising seal means for sealing between each extension sleeve and the rocker box.

7. The engine as recited in claim 5 wherein the seal means for sealing between each extension sleeve and the associated spark plug adapter sleeve comprises a flange at the outer end of the spark plug adapter sleeve and an "O" ring in the surface of the flange.

8. The engine as recited in claim 5 further comprising a threaded bore at an inner end of the spark plug adapter sleeve opposite its outer end to receive and secure the spark plug.

* * * * *

UNITED STATES PATENT AND TRADEMARK OFFICE
CERTIFICATE OF CORRECTION

PATENT NO. : 5,000,138
DATED : 3/19/91
INVENTOR(S) : John R. McR. Bennett

It is certified that error appears in the above-identified patent and that said Letters Patent is hereby corrected as shown below:

On the cover sheet, following the Inventor identification, please insert the following identification of the Assignee:

Assignee: Bennett Automotive Technology Pty. Ltd.
Melbourne, Victoria, Australia Signed and Sealed this Twelfth Day of May, 1992

Attest:

DOUGLAS B. COMER

Attesting Officer

Acting Commissioner of Patents and Trademarks